United States Patent
Suh et al.

(10) Patent No.: US 7,852,813 B2
(45) Date of Patent: Dec. 14, 2010

(54) SYSTEM AND METHOD FOR ACQUIRING CELL IN A FREQUENCY OVERLAY COMMUNICATION SYSTEM

(75) Inventors: Chang-Ho Suh, Seongnam-si (KR);
Jin-Kyu Koo, Suwon-si (KR);
Dong-Seek Park, Yongin-si (KR);
Young-Kwon Cho, Suwon-si (KR);
Eun-Taek Lim, Suwon-si (KR);
Jung-Soo Woo, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 950 days.

(21) Appl. No.: 11/510,000

(22) Filed: Aug. 25, 2006

(65) Prior Publication Data
US 2007/0054681 A1 Mar. 8, 2007

(30) Foreign Application Priority Data
Aug. 25, 2005 (KR) .................. 10-2005-0078356

(51) Int. Cl.
*H04B 7/216* (2006.01)
*H04J 13/00* (2006.01)
*H04J 11/00* (2006.01)
*H04W 4/00* (2009.01)

(52) U.S. Cl. ............... 370/335; 370/342; 370/481; 370/206; 370/208; 370/209; 455/422.1

(58) Field of Classification Search .............. 370/206, 370/208, 209, 320, 342, 481, 335; 455/422.1
See application file for complete search history.

(56) References Cited

U.S. PATENT DOCUMENTS

| 6,539,050 B1 * | 3/2003 | Lee et al. ............... 375/146 |
| 2004/0202103 A1 * | 10/2004 | Suh et al. ............... 370/208 |
| 2004/0214575 A1 * | 10/2004 | Jovanovic ............... 455/444 |

FOREIGN PATENT DOCUMENTS

| KR | 100236792 | 10/1999 |
| KR | 1020000075165 | 12/2000 |

* cited by examiner

*Primary Examiner*—Nick Corsaro
*Assistant Examiner*—Manpreet S Matharu
(74) *Attorney, Agent, or Firm*—The Farrell Law Firm, LLP

(57) ABSTRACT

A system for performing cell acquisition in a frequency overlay communication system having a first frequency band and a second frequency band including the first frequency band. A base station (BS) generates a reference signal used for identifying a cell using a specific sequence in a predetermined frequency band, and transmits the reference signal. A mobile station (MS) receives the reference signal to determine whether the BS uses the first frequency band or the second frequency band, determines a reference signal having a maximum correlation value through correlation calculation with at least one predefined sequence, and detects a BS identifier (ID) corresponding to the determined reference signal.

28 Claims, 10 Drawing Sheets

US 7,852,813 B2

SYSTEM AND METHOD FOR ACQUIRING CELL IN A FREQUENCY OVERLAY COMMUNICATION SYSTEM

PRIORITY

This application claims the benefit under 35 U.S.C. §119 (a) of an application filed in the Korean Intellectual Property Office on Aug. 25, 2005 and assigned Serial No. 2005-78356, the entire contents of which are incorporated herein by reference.

BACKGROUND OF THE INVENTION

1. Field of the Invention

The present invention relates generally to a system and method for performing cell acquisition in a communication system, and in particular, to a method and system for acquiring cells in a communication system using a frequency overlay scheme ("frequency overlay communication system").

2. Description of the Related Art

With the development of communication systems, the types of necessary services provided in communication systems are diversified, raising the need for a broadband communication system supporting broadband service. However, due to limited frequency resources in communication systems, broadband communication systems also have limitations on available frequency bands. In addition, because backward compatibility with the previously deployed communication systems should also be taken into consideration, design of broadband communication systems is difficult.

Current broadband communication systems were designed on the assumption that they use different frequency bands. However, development of communication technologies inevitably requires an increase in frequency bands for broadband service, increasing license costs for frequency bands. The increase in license costs causes delay in application of various schemes proposed to provide the broadband service.

As a result, there is a need for schemes for efficiently providing broadband service while overcoming the limitation on the frequency bands, i.e., while solving high-license costs problems for frequency bands. A broadband communication system that is overlaid with an existing communication system in a particular frequency band is a typical scheme. In this case, a mobile station (MS) existing in the broadband communication system is overlaid in the particular frequency band, and an MS of the existing communication system should be able to perform cell acquisition for recognizing a base station (BS) from which they can receive services.

A description will now be made of a general cell acquisition between a BS and an MS.

The BS and the MS should acquire mutual synchronization for signal transmission/reception, and for the synchronization acquisition, the BS transmits a synchronization signal so that the MS becomes aware of the start of the frame transmitted by the BS. Then the MS receives the synchronization signal transmitted by the BS, detects frame timing of the BS from the synchronization signal, and demodulates the frame. Generally, a particular preamble sequence predefined by the BS and the MS is used as the synchronization signal.

A preamble sequence used in an Orthogonal Frequency Division Multiplexing (OFDM) or Orthogonal Frequency Division Multiple Access (OFDMA) communication system should have a low Peak-to-Average Power Ratio (PAPR), and the preamble sequence is used for acquiring coarse synchronization and fine synchronization.

The transmission signal transmitted by the BS is distorted while passing through a wireless channel, and the MS receives the distorted transmission signal. The MS acquires time/frequency synchronization for the received distorted transmission signal using a predefined preamble sequence, performs channel estimation on the synchronization-acquired signal, and demodulates the channel-estimated signal into frequency-domain symbols through Fast Fourier Transform (FFT). After demodulating the frequency-domain symbols, the MS (or receiver) decodes the demodulated symbols into information data using a decoding scheme corresponding to the coding scheme used in the BS.

As described above, the preamble sequence is used for frame timing synchronization, frequency synchronization, and channel estimation. Each BS uses its own unique frame sequence. Therefore, the MS has information on every preamble sequence, detects the preamble sequence having the maximum correlation value through correlation calculation between a preamble sequence included in a received frame and every preamble sequence, and recognizes the BS corresponding to the detected preamble sequence as a serving BS that is providing the service to the MS.

There are various proposed methods for generating the preamble sequence for cell acquisition in general communication systems. However, in communication systems where an existing communication system and a broadband communication system overlaid with the existing communication system in a particular frequency band coexist, the preamble sequence should be designed such that it can distinguish a BS of the existing communication system from a BS of the broadband communication system. That is, the preamble sequence used in the existing communication system should be designed such that it can be used even in the broadband communication system. In addition, the preamble sequence of the broadband communication system should be designed such that its correlation with the preamble sequence of the existing communication system is minimized.

However, there is no specific known method for generating a preamble sequence designed taking into account a communication system where an existing communication system and a broadband communication system overlaid with the existing communication system in a particular frequency band coexist. In addition, the MS, whose operation mode is set to enable communication with the existing communication system, should be able to perform cell acquisition when it is located in the broadband communication system. The MS, whose operation mode is also set to enable communication with the broadband communication system, should also be able to perform cell acquisition when it is located in the existing communication system.

SUMMARY OF THE INVENTION

It is, therefore, an object of the present invention to provide a system and method for generating a reference signal for cell acquisition in a frequency overlay communication system.

It is another object of the present invention to provide a system and method for performing cell acquisition using a reference signal in a frequency communication system.

According to one aspect of the present invention, there is provided a system for performing cell acquisition in a frequency overlay communication system having a first frequency band and a second frequency band including the first frequency band. The system includes a base station (BS) for generating a reference signal used for identifying a cell using a specific sequence in a predetermined frequency band, and transmitting the reference signal; and a mobile station (MS)

for receiving the reference signal to determine whether the BS uses the first frequency band or the second frequency band, determining a reference signal having a maximum correlation value through correlation calculation with at least one pre-defined sequence, and detecting a BS identifier (ID) corresponding to the determined reference signal.

According to another aspect of the present invention, there is provided a method for performing cell acquisition by a mobile station (MS) in a frequency overlay communication system having a first frequency band and a second frequency band including the first frequency band. The method includes receiving a reference signal used for identifying a cell using a specific sequence in a predetermined frequency band; determining whether a corresponding base station (BS) uses the first frequency band or the second frequency band; determining a reference signal having the maximum correlation value through correlation calculation with at least one predefined sequence; and detecting a BS identifier (ID) corresponding to the determined reference signal.

According to further another aspect of the present invention, there is provided a method for transmitting a reference signal for cell acquisition by a base station (BS) in a frequency overlay communication system having a first frequency band and a second frequency band including the first frequency band. The method includes generating a reference signal for cell identification using a specific sequence in a predetermined frequency band; multiplexing the reference signal with data and a control signal; and performing Inverse Fast Fourier Transform (IFFT) on the multiplexed signal and transmitting the IFFT-processed signal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention will now be described in detail with reference to the annexed drawings. In the following description, a detailed description of known functions and configurations incorporated herein has been omitted for clarity and conciseness.

The present invention provides a system and method in which a base station (BS) generates a reference signal for cell acquisition, and a mobile station (MS) performs cell acquisition using the reference signal in a communication system using a frequency overlay scheme ("frequency overlay communication system"). The reference signal includes a preamble sequence and a pilot signal. The preamble sequence can be generated by concatenating Golay Complementary Sequences (GCS).

For convenience, an MS using a non-overlaid frequency band is referred to as a Narrow Band-Mobile Station (NB-MS), and an MS using an extended frequency band including the non-overlaid frequency band is referred to as an Extended Band-Mobile Station (EB-MS). In addition, a BS providing the non-overlaid frequency band is referred to as a Narrow Band-Base Station (NB-BS), and a BS providing an extended frequency band including the non-overlaid frequency band is referred to as an Extended Band-Base Station (EB-BS).

In the frequency overlay communication system, either one of the NB-BS and the EB-BS may exist, or the NB-BS and the EB-BS may both coexist. Therefore, when the NB-BS and the EB-BS coexist in the frequency overlay communication system, backward compatibility between the NB-BS and the EB-BS is very important.

Figure 1:
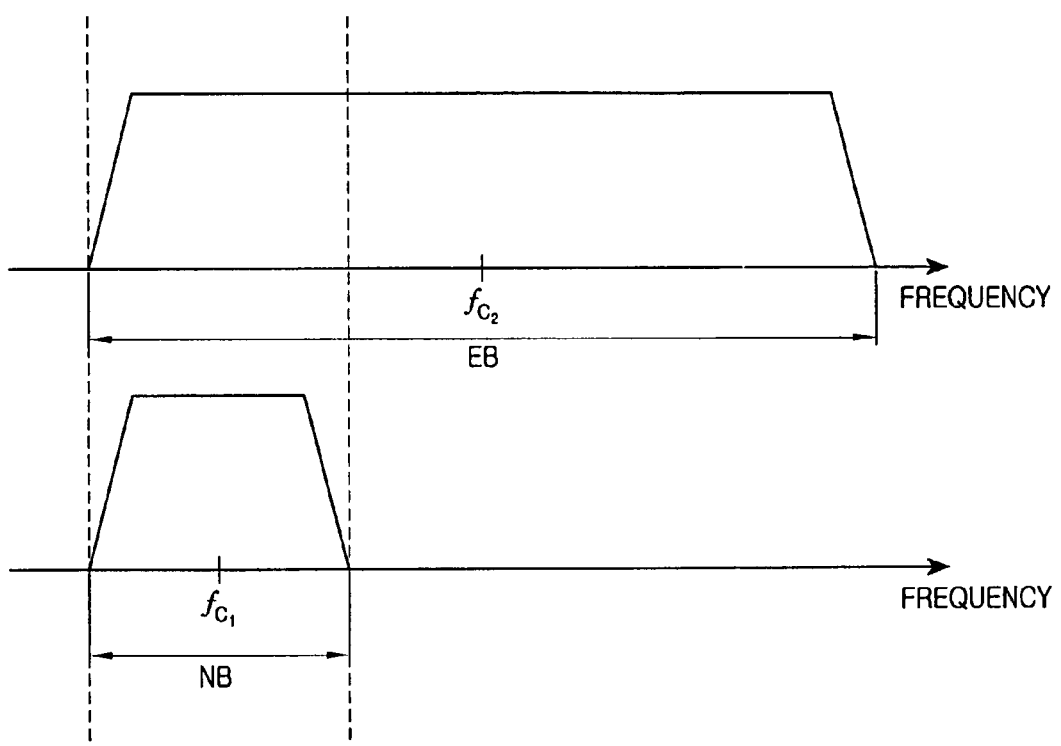
FIG. 1 is a diagram illustrating a frequency allocation operation in a frequency overlay communication system according to the present invention.

FIG. 1 shows a frequency allocation operation in a frequency overlay communication system according to the present invention.

The existing communication system is a narrow band (NB) communication system having a center frequency $f_{c1}$ ("NB communication system"). The NB communication system may require extension of the frequency bandwidth due to diversification of the services and an increase in the required transmission capacity. Therefore, a communication system with extended frequency bandwidth can be considered, and the communication system with the extended frequency band ("EB communication system") can be designed such that it is overlaid with the NB communication system in the frequency band. In this case, in FIG. 1, the EB communication system has a center frequency $f_{c2}$. Although terms such as the "Narrow Band" and "Extended Band" are used for convenience in that the NB communication system can be relatively narrower in frequency bandwidth than the EB communication system, this does not imply that the frequency band used in the NB communication system should be absolutely narrow. The reasons for extending the frequency bandwidth using the frequency overlay scheme are as follows.

(1) Reduction in License Cost for Frequency Band

Deployment, in a new communication system, of a frequency band being different from the frequency band used in the NB communication system without using the frequency overlay scheme needs additional license cost for the frequency band, similar to where the communication system uses a new frequency band. However, use of the frequency overlay scheme only needs the additional license cost for the bandwidth additionally increased from the existing frequency band. As a result, the burden of the license cost for the frequency bands on the service providers decreases because they are allowed to bear only the additional license cost.

(2) Increase in Frequency Resource Efficiency in Overlay Frequency Band

The use of the frequency overlay scheme increases frequency resource efficiency in the overlaid frequency band. The frequency resource efficiency is very important for service providers because service providers can benefit from their subscribers in proportion to the frequency resource efficiency.

Figure 2:
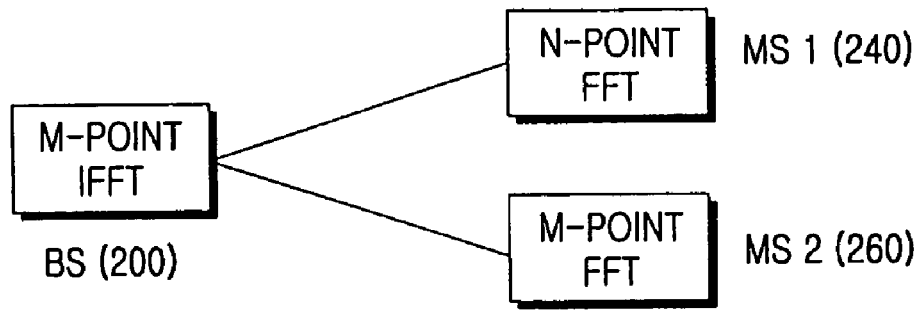
FIG. 2 is a diagram illustrating a transceiver module used in a frequency overlay communication system according to the present invention.

FIG. 2 shows a transceiver module used in a frequency overlay communication system according to the present invention.

It is assumed in FIG. 2 that the number of Inverse Fast Fourier Transform (IFFT)/Fast Fourier Transform (FFT) points of a transceiver module used in a communication system before a bandwidth of its frequency band in use is extended, i.e., an NB communication system, is N, and the number of IFFT/FFT points of a transceiver module used in a communication system after a bandwidth of its frequency band in use is extended, i.e., an EB communication system, is M (where M>N).

In this case, a BS 200 can support services to an MS1 240 of the NB communication system and an MS2 260 of the EB communication system with an M-point IFFT/FFT module without separately including an N-point IFFT/FFT module. In order to support services to the MSs of both the NB communication system and the EB communication system with one IFFT/FFT module, i.e., the M-point IFFT/FFT module, in this way, it is necessary to provide a guard band between boundary frequency bands of the NB communication system and the EB communication system. A specific size of the guard band depends upon performance of a band-pass filter (BPF).

Figure 3:
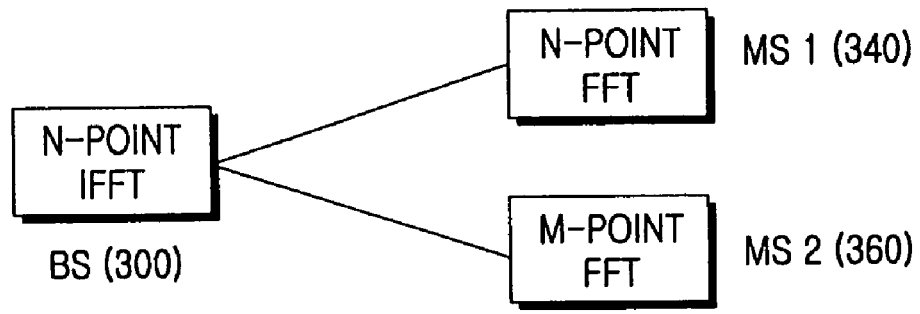
FIG. 3 is a diagram illustrating an alternative transceiver module used in a frequency overlay communication system according to the present invention.

FIG. 3 shows an alternative transceiver module used in a frequency overlay communication system according to the present invention.

In FIG. 3, it is similarly assumed that the number of IFFT/FFT points of a transceiver module used in the NB communication system is N, and the number of IFFT/FFT points of a transceiver module used in the EB communication system is M (where M>N).

However, when the system is extended, it is preferable to deploy BSs using the frequency overlay scheme. In some cases, however, the BSs using the frequency overlay scheme cannot be deployed in a particular region, and the BSs using the N-point IFFT/FFT module used in the exiting NB communication system are maintained.

After the system extension is completed, while there is almost no case where only the NB-BSs are deployed in a particular region, in the course of the system extension, such cases inevitably occur. Therefore, unlike the BS of FIG. 2, the BS of FIG. 3, if it is an NB-BS, should take into account even the IFFT/FFT points of the transceiver module used in the EB communication system.

An NB-BS 300 uses only an N-point IFFT/FFT module. If there is only the guard band between the frequency band used in the EB communication system and the frequency band used in the NB communication system, the NB-BS 300 can communicate not only with an MS1 340 having an N-point IFFT/FFT module but also with an MS2 360 having an M-point IFFT/FFT module, using only the N-point IFFT/FFT module. A specific size of the guard band depends upon performance of a BPF, and the guard band is not related to the present invention, so a detailed description will be omitted.

The reason why communication between the M ($=2^m \times N$)-point IFFT module of the EB communication system and an N-point FFT module of the NB communication system described below is possible is as follows.

For example, it is assumed that the signal actually desired by a receiver is mapped only to the N-point part in the ($2^m \times N$)-point IFFT module. Next, the data after passing through the M-point IFFT module is up-converted to a band of a carrier frequency $f_{c1}$ used in the NB communication system through a band-pass filtering process. Thereafter, the up-converted data is subject to band-pass filtering taking into account a bandwidth $W_{EB}$ occupied by the ($2^m \times N$) points. The band-pass filtered data is transmitted via a transmission antenna.

In a downlink, an NB-MS corresponding to a receiver receives the signal transmitted from the transmitter, i.e. BS 300, via a reception antenna. Thereafter, the MS performs band-pass filtering on the received signal according to a bandwidth $W_{NB}$ for the N points. The MS can restore even the data transmitted by the BS through the M ($=2^m \times N$)-point IFFT due to $W_{NB}$ band-pass filtering, simply with only the N-point FFT other than the ($2^m \times N$)-point IFFT. The band-pass filtered signal can be restored to its original signal through an N-point FFT module 340. That is, the NB-MS finds a position of the resources allocated thereto according to a control signal, and then restores the traffic signal.

Figure 4:
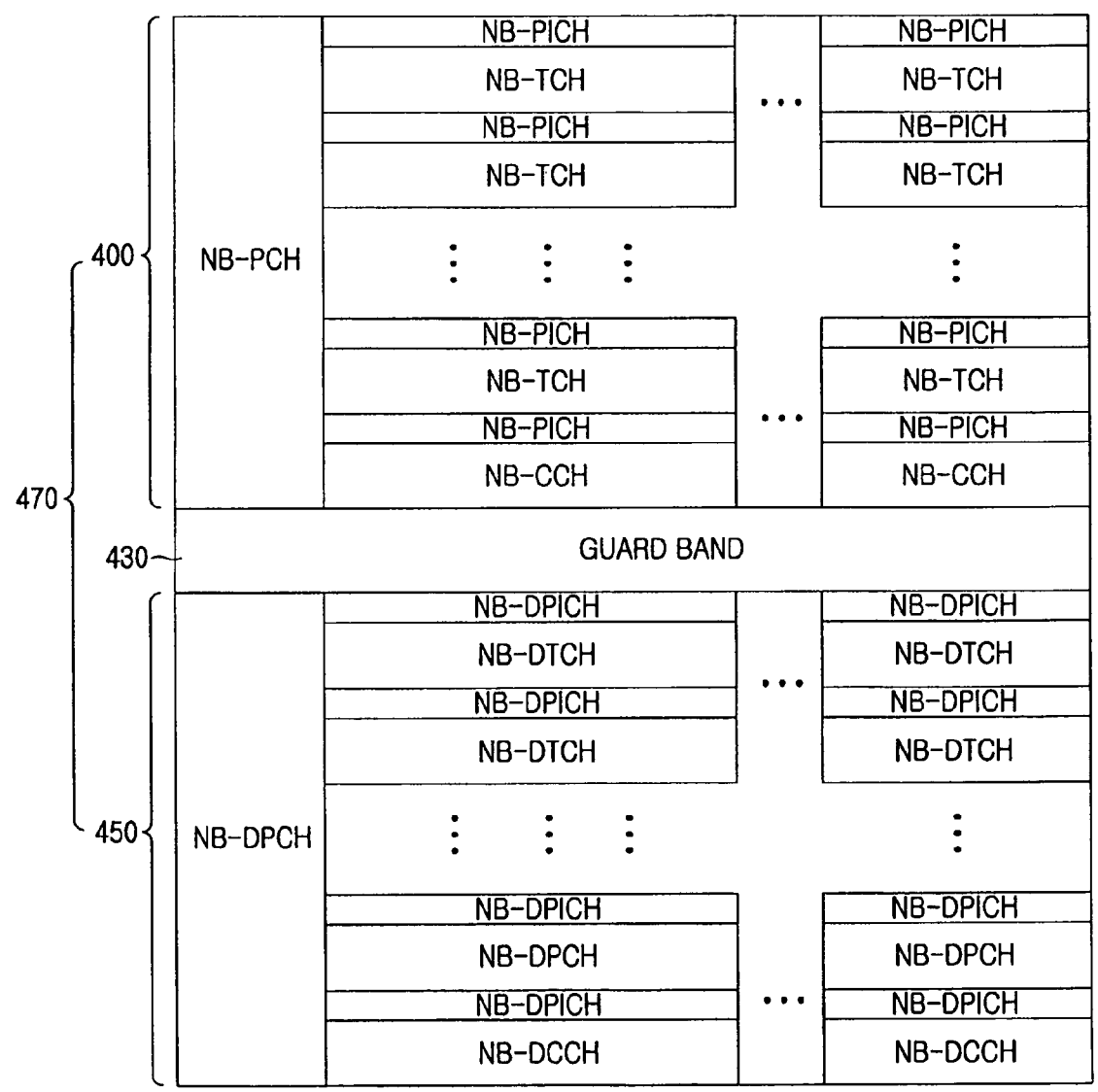
FIG. 4 is a diagram illustrating a downlink frame structure of a frequency overlay communication system according to the present invention.

FIG. 4 shows a downlink frame structure of a frequency overlay communication system according to the present invention. A downlink frame 470 of the EB communication system (hereinafter referred to as an "EB communication system's downlink frame") includes a downlink frame 400 currently used in the NB communication system (hereinafter referred to as an "NB communication system's downlink frame"), a downlink frame dependently added to the NB communication system for the EB communication system, i.e. NB communication system-dependent downlink frame 450, and a guard band 430 between the NB communication system's downlink frame 400 and the NB communication system-dependent downlink frame 450.

The NB communication system's downlink frame 400 includes a Narrow Band-Preamble Channel (NB-PCH), a Narrow Band-Pilot Channel (NB-PICH), a Narrow Band-Traffic Channel (NB-TCH), and a Narrow Band-Control Channel (NB-CCH).

The NB communication system-dependent downlink frame 450 includes a Narrow Band-Dependent Preamble Channel (NB-DPCH), a Narrow Band-Dependent Pilot Channel (NB-DPICH), a Narrow Band-Dependent Traffic Channel (NB-DTCH), and a Narrow Band-Dependent Control Channel (NB-DCCH).

As described above, the EB communication system's downlink frame 470 includes the NB communication system's downlink frame 400, the guard band 430, and the NB communication system-dependent downlink frame 450. As a result, the EB communication system's downlink channel structure is as follows.

An Extended Band-Preamble Channel (EB-PCH) of the EB communication system includes the NB-PCH and the NB-DPCH. An Extended Band-Pilot Channel (EB-PICH) of the EB communication system includes the NB-PICH and the NB-DPICH. An Extended Band-Traffic Channel (EB-TCH) of the EB communication system includes the NB-TCH and the NB-DTCH. Finally, an Extended Band-Control Channel (EB-CCH) of the EB communication system includes the NB-CCH and the NB-DCCH.

A description will now be made of the EB-PCH and the EB-PICH related to the present invention among the downlink channels of the EB communication system.

First, for backward compatibility between the NB communication system and the EB communication system, the EB-PCH should not only include the intact NB-PCH, but also should be designed to minimize its correlation with the NB-PCH and maximize time/frequency synchronization and channel estimation performances. Therefore, the NB-DPCH should necessarily have a structure dependent on the NB-PCH. In addition, the EB-PCH should be designed so that it is available not only for the time/frequency synchronization and channel estimation, but also for cell acquisition.

Second, for the backward compatibility between the NB communication system and the EB communication system, the EB-PICH includes not only the intact NB-PICH, but also includes the NB-DPICH having a structure dependent on the NB-PICH. In addition, the use of the EB-PICH cannot only achieve cell acquisition as described above, but also performs time/frequency synchronization and channel estimation, similar to the EB-PCH.

Figure 5:
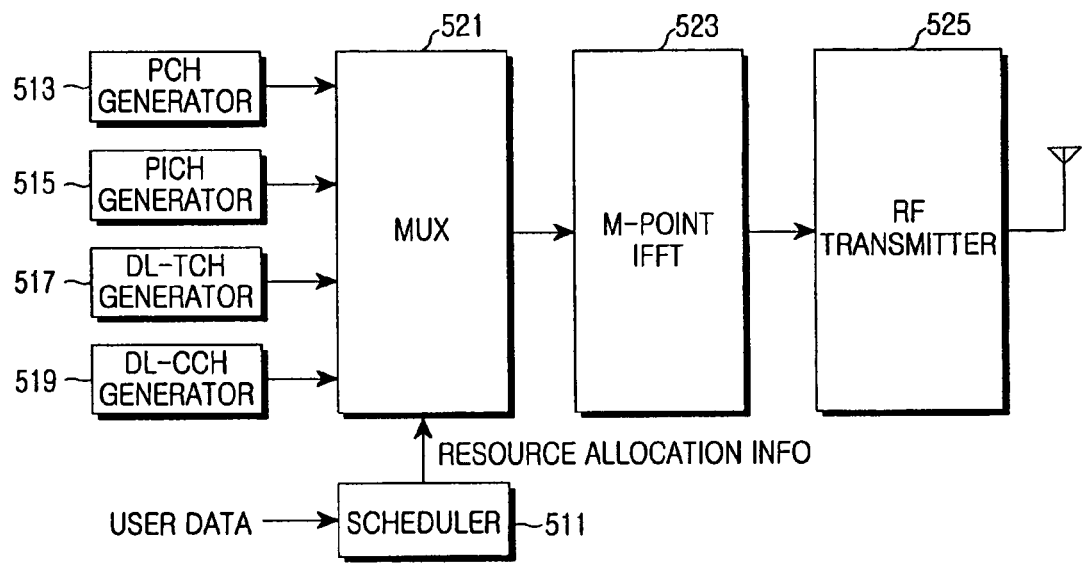
FIG. 5 is a diagram illustrating a structure of an EB-BS transmission apparatus in a frequency overlay communication system according to the present invention.

Referring to FIG. 5, an EB-BS transmission apparatus in a frequency overlay communication system according to the present invention includes scheduler 511, PCH generator 513, PICH generator 515, a DL-TCH generator 517, a DL-CCH generator 519, multiplexer (MUX) 521, M-point IFFT unit 523, and Radio Frequency (RF) transmitter 525.

User data for all MSs serviced in the EB communication system is delivered to scheduler 511, and scheduler 511 schedules the user data according to a predetermined scheduling scheme, and outputs the scheduled user data to DL-TCH generator 517 and resource allocation information for the scheduled user data to DL-CCH generator 519 and multiplexer 521. The scheduling operation of scheduler 511 is not directly related to the present invention, so a detailed description will be omitted.

PCH generator 513 generates a PCH, i.e. an EB-PCH including an NB-PCH, a guard band signal and an NB-DPCH, and outputs the PCH to multiplexer 521. PICH generator 515 generates a PICH, i.e. an EB-PICH including an NB-PICH, a guard band signal and an NB-DPICH, and outputs the PICH to multiplexer 521. DL-TCH generator 517 generates a DL-TCH, i.e. an EB-TCH including an NB-TCH and an NB-DTCH, and outputs the DL-TCH to multiplexer 521. DL-CCH generator 519 generates a DL-CCH, i.e. an EB-CCH including an NB-CCH and an NB-DCCH, and outputs the DL-CCH to multiplexer 521.

Multiplexer 521 generates a downlink channel by multiplexing the PCH output from PCH generator 513, the PICH output from PICH generator 515, the DL-TCH output from DL-TCH generator 517, and the DL-CCH output from DL-CCH generator 519 in a time domain and a frequency domain according to the resource allocation information output from scheduler 511, and outputs the downlink channel to M-point IFFT unit 523.

M-point IFFT unit 523 performs M-point IFFT on the downlink channel signal output from multiplexer 521, and outputs the IFFT-processed signal to RF transmitter 525. RF transmitter 525 performs a transmission process, i.e. RF process, on the signal output from M-point IFFT unit 523, and transmits the RF-processed signal over the air via an antenna.

Figure 6:
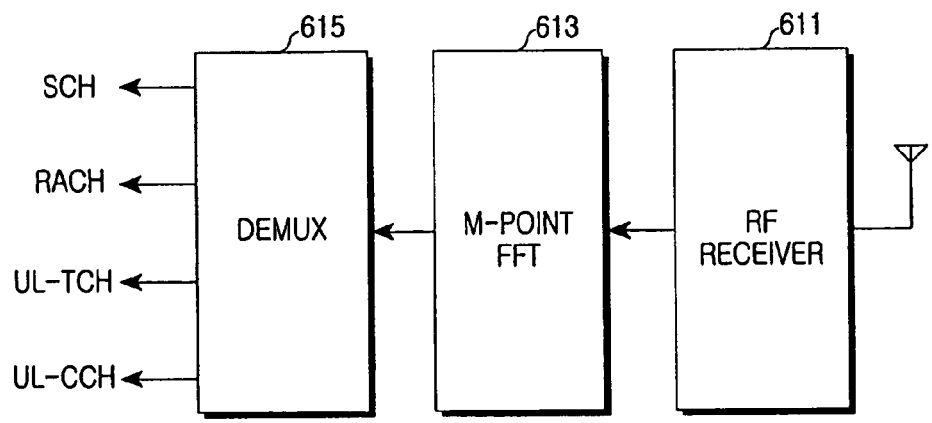
FIG. 6 is a diagram illustrating a structure of an EB-BS reception apparatus in a frequency overlay communication system according to the present invention.

The EB-BS transmission apparatus in the frequency overlay communication system according to the present invention has been described so far with reference to FIG. 5. With reference to FIG. 6, a description will be made of an EB-BS reception apparatus in a frequency overlay communication system according to the present invention.

FIG. 6 is a diagram illustrating a structure of an EB-BS reception apparatus in a frequency overlay communication system according to the present invention.

Referring to FIG. 6, the EB-BS reception apparatus includes RF receiver 611, M-point FFT unit 613, and demultiplexer (DEMUX) 615.

RF receiver 611 performs a reception process on an RF signal received via an antenna, i.e. converts the RF signal into a baseband signal, and outputs the baseband signal to M-point FFT unit 613. M-point FFT unit 613 performs M-point FFT on the baseband signal output from RF receiver 611, and outputs the FFT-processed signal to demultiplexer 615. Demultiplexer 615 demultiplexes the signal output from M-point FFT unit 613 in the time domain and the frequency domain, and outputs a Synchronization Channel (SCH), a Random Access Channel (RACH), an Uplink-Traffic Channel (UL-TCH) and an Uplink-Control Channel (UL-CCH). Herein, the SCH is an Extended Band-Synchronization Channel (EB-SCH) including a Narrow Band-Synchronization Channel (NB-SCH) and a Narrow Band-Dependent Synchronization Channel (NB-DSCH). In addition, the RACH is an Extended Band-Random Access Channel (EB-RACH) including a Narrow Band-Random Access Channel (NB-RACH) and a Narrow Band-Dependent Random Access Channel (NB-DRACH).

Figure 7:
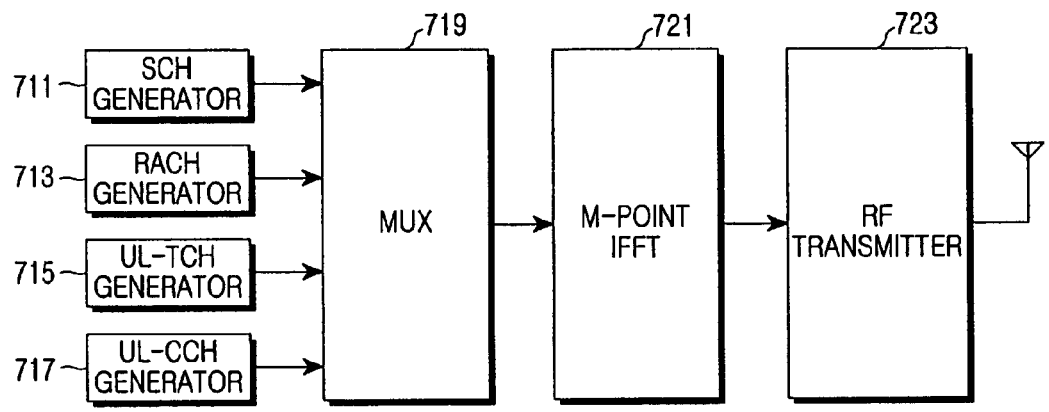
FIG. 7 is a diagram illustrating a structure of an EB-MS transmission apparatus in a frequency overlay communication system according to the present invention.

FIG. 7 shows an EB-MS transmission apparatus in a frequency overlay communication system according to the present invention.

The EB-MS transmission apparatus includes SCH generator 711, RACH generator 713, UL-TCH generator 715, UL-CCH generator 717, multiplexer 719, M-point IFFT unit 721, and RF transmitter 723. The RACH generator 713 generates an RACH, i.e. an EB-RACH including an NB-RACH and an NB-DRACH, and outputs the RACH to multiplexer 719. UL-TCH generator 715 generates a UL-TCH, i.e. an EB-TCH including an NB-TCH and an NB-DTCH, and outputs the UL-TCH to multiplexer 719. The UL-CCH generator 717 generates a UL-CCH, i.e. an EB-CCH including an NB-CCH and an NB-DCCH, and outputs the UL-CCH to multiplexer 719.

In FIG. 7, although SCH generator 711, RACH generator 713, UL-TCH generator 715 and UL-CCH generator 717 generate all channels available in the EB communication system by way of example in order to support the EB communication system, they can also generate the corresponding channels under the control of the EB communication system. For example, RACH generator 713 generates only the NB-RACH when the EB-BS permits the EB-MS to perform random access through the NB-RACH.

Figure 8:
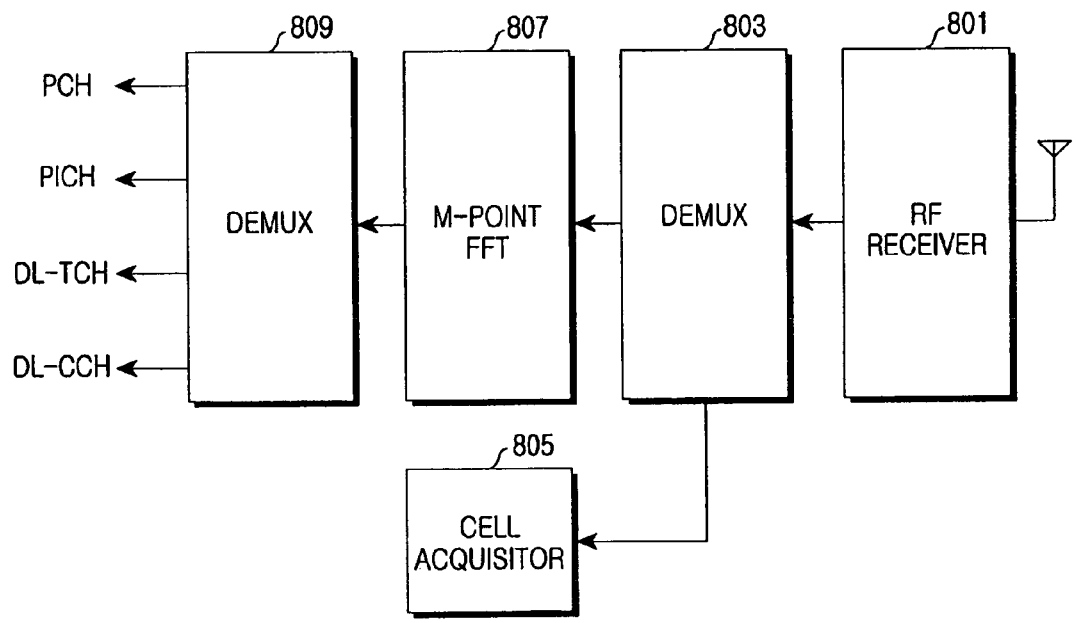
FIG. 8 is a diagram illustrating a structure of an EB-MS reception apparatus in a frequency overlay communication system according to the present invention.

FIG. 8 shows an EB-MS reception apparatus in a frequency overlay communication system according to the present invention.

The EB-MS reception apparatus includes RF receiver 801, demultiplexer 803 for performing demultiplexing in the time domain, cell acquisitor 805, M-point FFT unit 807, and demultiplexer 809 for performing demultiplexing in the frequency domain.

RF receiver 801 performs a reception process on an RF signal received via an antenna, i.e. converts the RF signal into a baseband signal, and outputs the baseband signal to demultiplexer 803. Demultiplexer 803 demultiplexes its input signal in the time domain and separates a preamble channel, i.e. PCH, from the input signal. The PCH is input to cell acquisitor 805 and M-point FFT unit 807, and cell acquisitor 805 acquires a BS, i.e. cell, from which the EB-MS can receive service, through correlation calculation on a preamble sequence included in the PCH.

In FIG. 8, although the EB-MS reception apparatus receives all channels available in the EB communication system by way of example in order to support the EB communication system, it can also selectively receive the corresponding channels under the control of the EB communication system. For example, the EB-MS reception apparatus can receive only either one of or both of the NB-TCH and the NB-DTCH under the control of the EB-BS.

Figure 9:
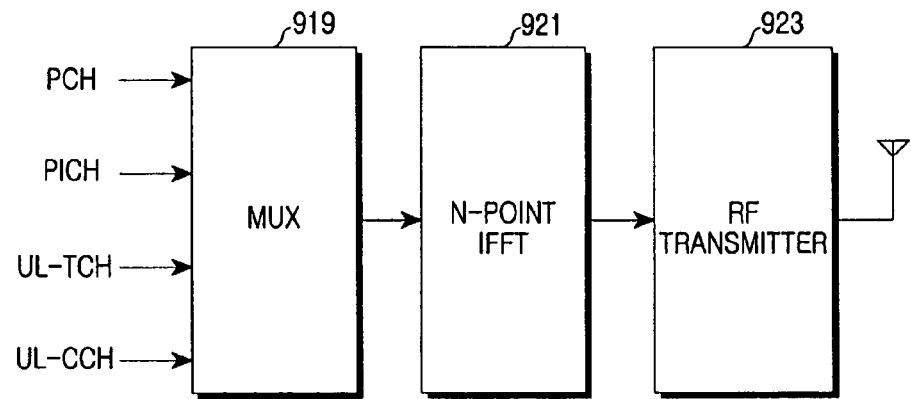
FIG. 9 is a diagram illustrating a structure of an NB-MS transmission apparatus in a frequency overlay communication system according to the present invention.

FIG. 9 shows an NB-MS transmission apparatus in a frequency overlay communication system according to the present invention.

The NB-MS transmission apparatus is similar to the EB-MS transmission apparatus of FIG. 7. However, the frequency bandwidth and center frequency of the NB-MS transmission apparatus is different from the EB-MS transmission apparatus. Therefore, it should be noted that the number of points of an N-point IFFT unit 921 in the NB-MS transmission apparatus is less than the number of points of the M-point IFFT unit in the EB-MS.

Figure 10:
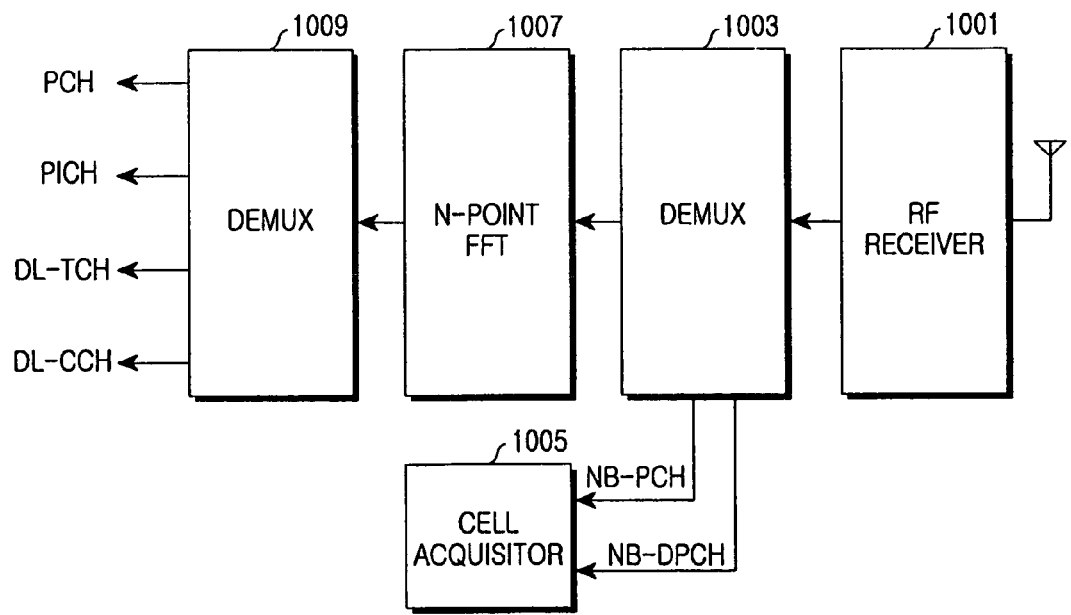
FIG. 10 is a diagram illustrating a structure of an NB-MS reception apparatus in a frequency overlay communication system according to the present invention.

FIG. 10 shows an NB-MS reception apparatus in a frequency overlay communication system according to the present invention.

The NB-MS reception apparatus is similar to the EB-MS reception apparatus of FIG. 8. However, the frequency bandwidth and center frequency of the NB-MS reception apparatus is different from the EB-MS reception apparatus. The number of points of an N-point FFT unit 1007 in the NB-MS reception apparatus is less than the number of points of the M-point FFT unit in the EB-MS.

The NB-MS can be located either in the coverage area of the EB-BS, or in the coverage area of the NB-BS. The NB-MS can perform cell acquisition according to the present invention regardless of whether it is located in the coverage area of the EB-BS or located in the coverage area of the NB-BS. In order to perform cell acquisition, the NB-MS or the EB-MS uses two kinds of information: one is an NB-PCH which is preamble information for the NB band, and another is an NB-DPCH which is preamble information for bands other than the NB band. The NB-MS or the EB-MS acquires the NB-PCH and the NB-DPCH while shifting the center frequency at different intervals. A cell acquisition process performed by the NB-MS or the EB-MS is described below with reference to the FIG. 15.

Figure 11:
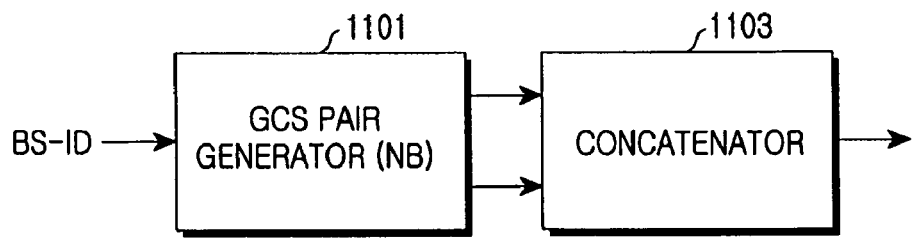
FIG. 11 is a diagram illustrating a detailed structure of a PCH generator in a frequency overlay communication system according to the present invention.

FIG. 11 shows a PCH generator in a frequency overlay communication system according to the present invention.

It should be noted that the preamble sequence according to the present invention is generated using Golay complementary sequences. The Golay complementary sequences can be expressed as $$C_A(u) \sum_{k=0}^{n-1-u} A_k A_{k+u}^*,$$

(for $u = 1, 2, \cdots, n-2$)

$$C_B(u) \sum_{k=0}^{n-1-u} B_k B_{k+u}^*,$$

(for $u = 1, 2, \cdots, n-2$)

$$C_A(u) + C_B(u) = 0$$

If the sum of periodic autocorrelation functions of arbitrary sequences $C_A(u)$ and $C_B(u)$ is 0, the $C_A(u)$ and the $C_B(u)$ each are Golay complementary sequences, and the $C_A(u)$ and the $C_B(u)$ make a Golay complementary sequence pair, where $u \ne 0$.

If the Golay complementary sequences are mapped to IFFT inputs according to a predetermined mapping scheme, an IFFT output has a Peak-to-Average Power Ratio (PAPR) below 3 dB. Therefore, the Golay complementary sequences are useful for generation of a preamble sequence requiring a low PAPR. In addition, the Golay complementary sequences can be usefully applied even to the frequency overlay communication system according to the present invention. This is because according to the characteristics of the Golay complementary sequences, a sequence obtained by concatenating the Golay complementary sequences $C_A(u)$ and $C_B(u)$ is also a Golay complementary sequence. Therefore, in the frequency overlay communication system that generally extends its frequency bandwidth in exponentially, the sequence generated by concatenating a Golay complementary sequence used in the NB-BS using the center frequency $f_{c1}$ and the frequency bandwidth 10 MHz, to a Golay complementary sequence used in the NB-BS using the center frequency $f_{c2}$ and the frequency bandwidth 10 MHz can be used as a preamble sequence of the EB-BS using the center frequency $f_{c3}$ and the frequency bandwidth 20 MHz. This is the reason that the EB communication system is useful for the frequency overlay communication system that should include the preamble sequence used before extension of the frequency band.

Referring to FIG. 11, the PCH generator includes Golay Complementary Sequences (GCS) pair generator 1101 and concatenator 1103.

GCS pair generator 1101 generates a first Golay complementary sequence pair by selecting one Golay complementary sequence pair unused in other BSs among a plurality of Golay complementary sequence pairs according to an input BS identifier (ID). In addition, GCS pair generator 1101 generates a second Golay complementary sequence pair associated with the first Golay complementary sequence pair. The generated Golay complementary sequence pairs are input to concatenator 1103, and concatenator 1103 concatenates the input Golay complementary sequence pairs to each other, and outputs a new Golay complementary sequence. Each of the components constituting the output Golay complementary sequence is mapped to a predetermined number of subcarriers, generating a specific PCH.

Figure 12:
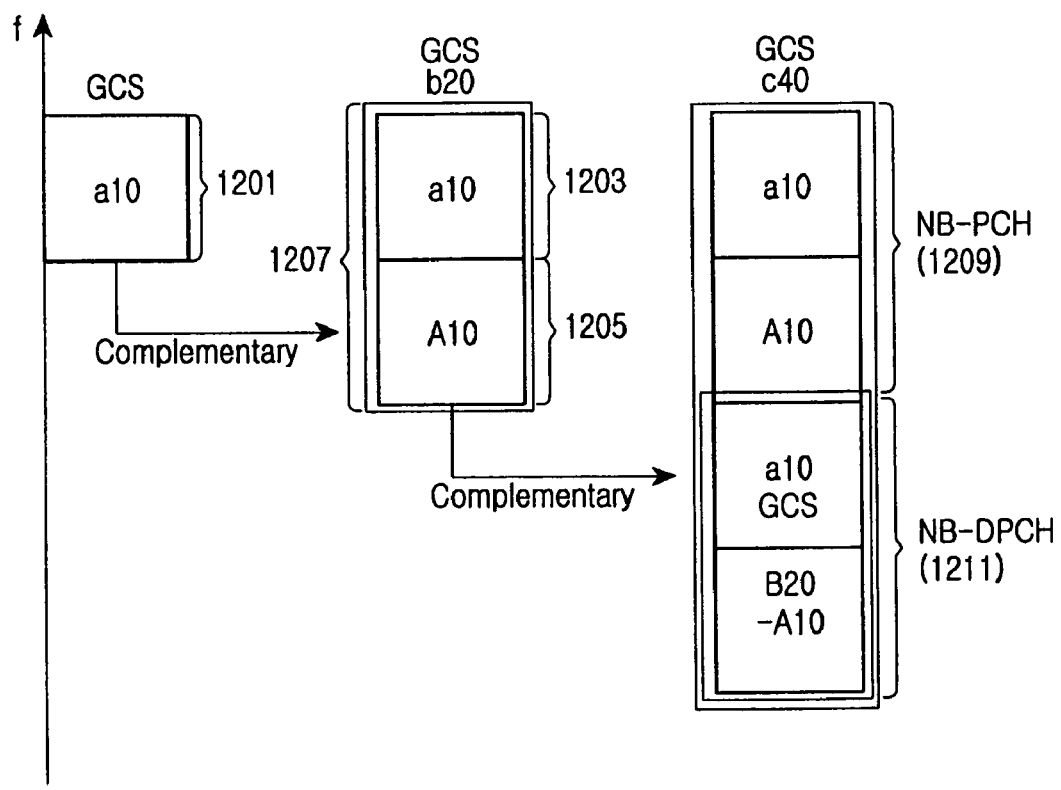
FIG. 12 is a diagram illustrating a PCH generation process according to the present invention.

FIG. 12 shows a PCH generation process according to the present invention.

A GCS a10 (1201) has A10 1205 as a GCS pair. The a10 1201 and the A10 1205 are complementary to each other. A sequence generated by concatenating the GCS pair a10 1203 and A10 1205 to each other is a new GCS b20 (1207). In addition, the GCS b20 (1207) has B20 1211 as a GCS pair.

Therefore, a sequence generated by concatenating the GCS pair b20 1209 and B20 1211 to each other is a new GCS c40. The GCS c40 is generated by concatenating B20 1211 obtained by inverting a sign of the A10 1205 constituting the GCS b20 (1207), to the b20 1209. The GCS c40 can be generated with b20=[a10 A10] and B20=[a10−A10 In the GCS c40, the b20 1209 can be used for the NB-PCH, and the B20 1211 can be used for the NB-DPCH.

Figure 13:
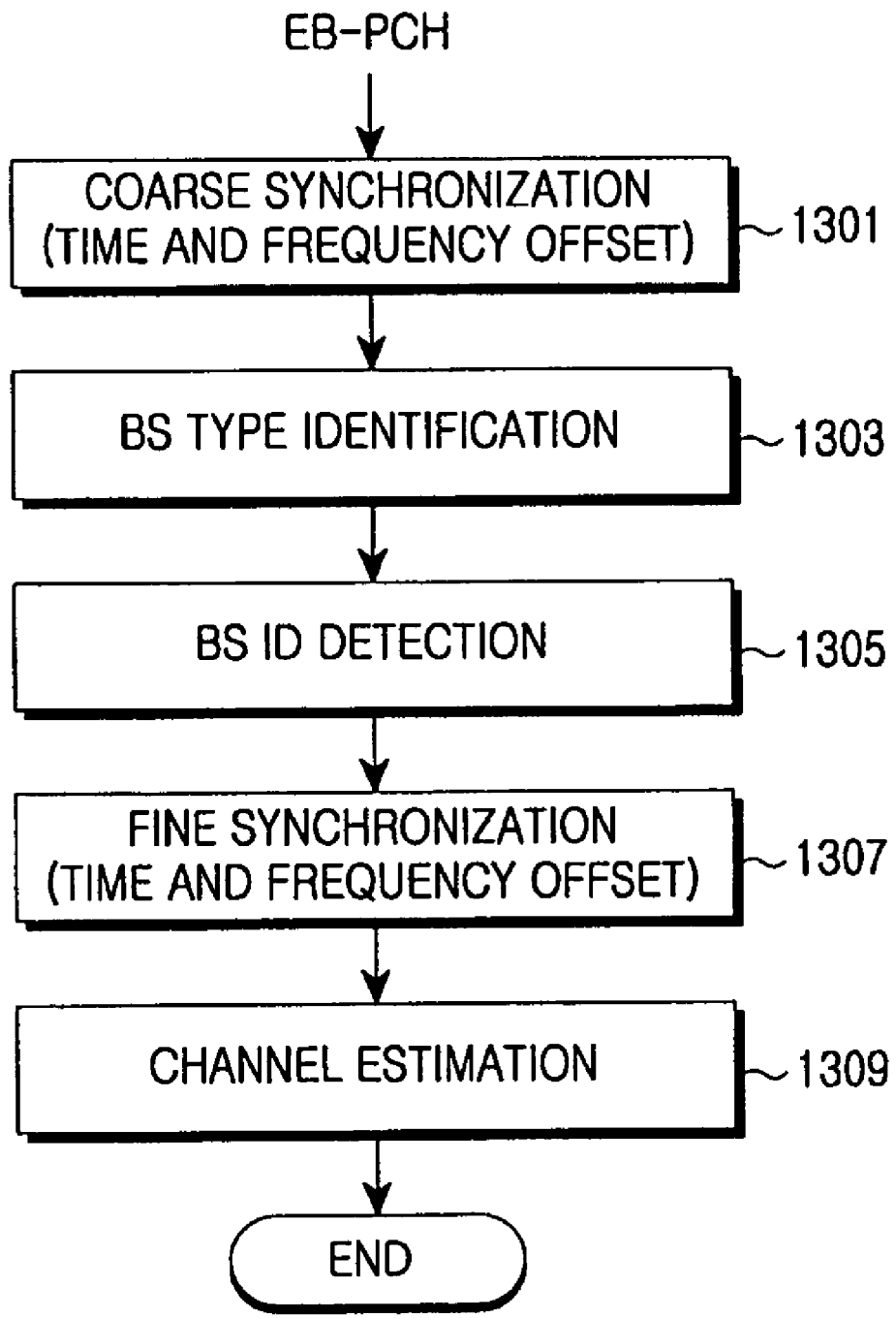
FIG. 13 is a flowchart illustrating a process in which an EB-MS performs cell acquisition, synchronization, and channel estimation in a frequency overlay communication system according to the present invention.
Figure 14:
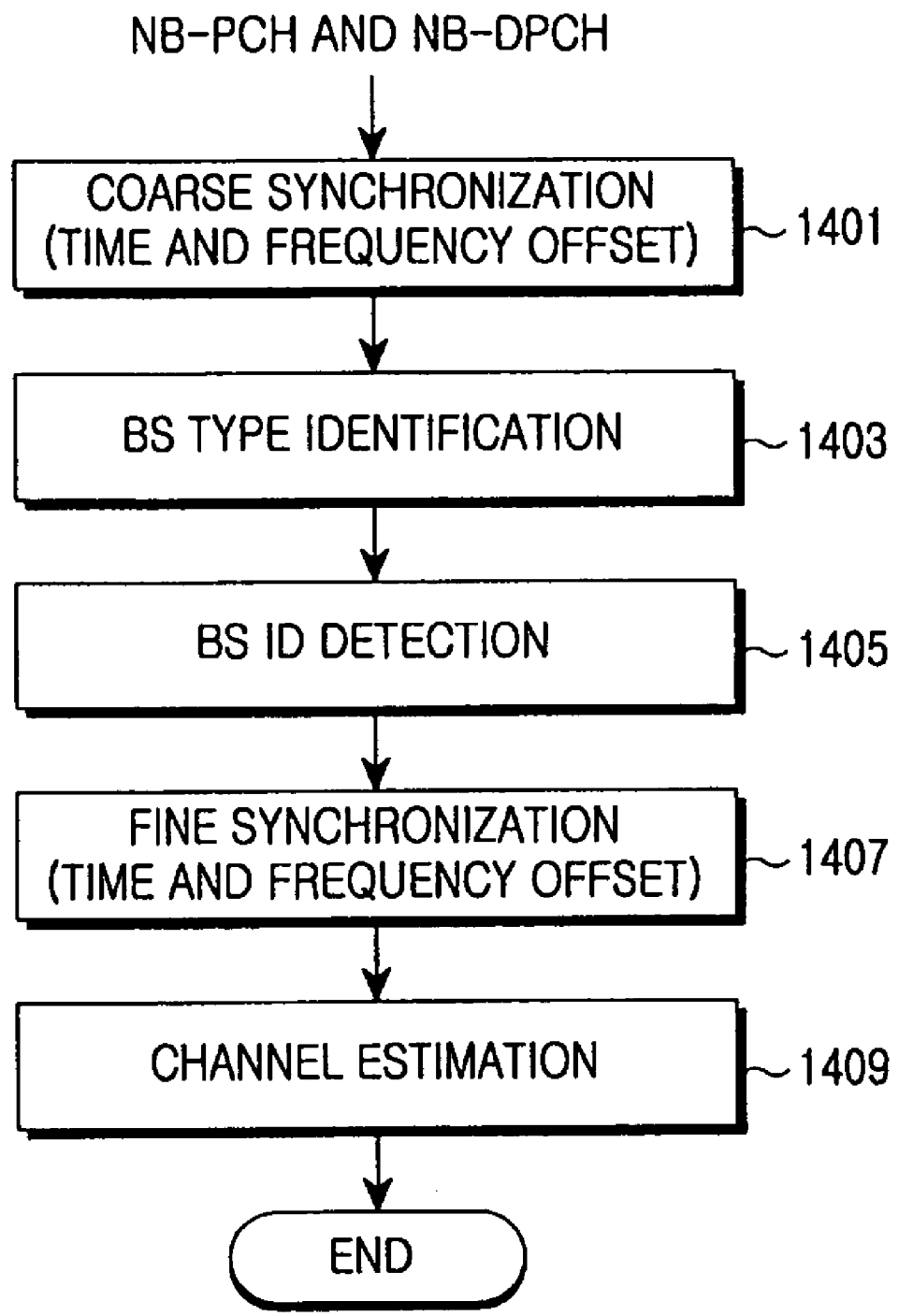
FIG. 14 is a flowchart illustrating a process in which an NB-MS performs cell acquisition, synchronization, and channel estimation in a frequency overlay communication system according to the present invention.
Figure 15:
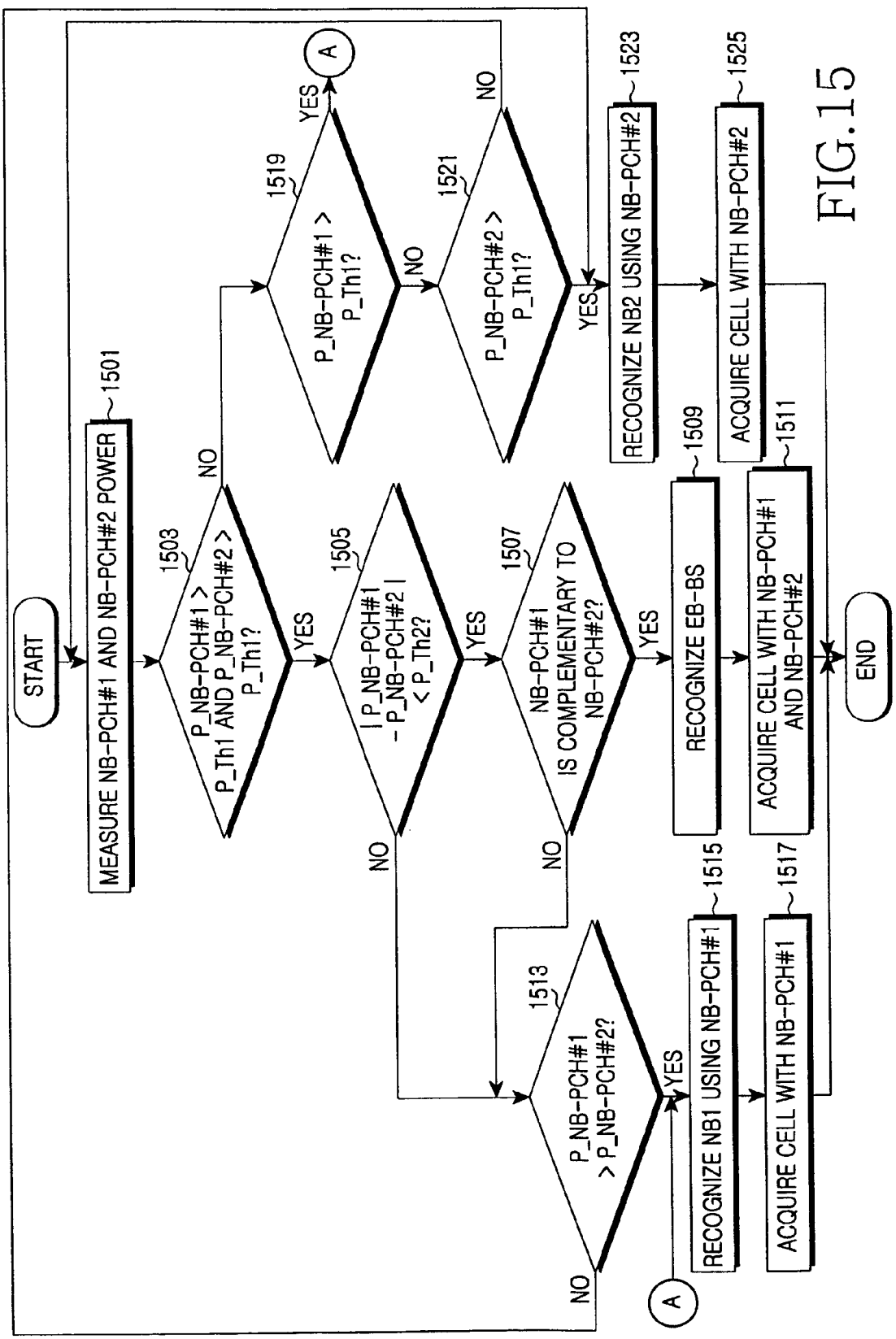
FIG. 15 is a flowchart illustrating a process in which an NB-MS or an EB-MS performs cell acquisition according to the present invention.

Operations performed by the EB-MS and the NB-MS using the PCH are shown in FIGS. 13 to 15.

FIG. 13 shows a process in which an EB-MS performs cell acquisition, synchronization, and channel estimation in a frequency overlay communication system according to the present invention.

In step 1301, the EB-MS receives a PCH of a downlink frame from a particular BS, and detects a preamble sequence from the PCH. The EB-MS performs coarse synchronization using the detected preamble sequence, and then proceeds to step 1303. Generally, because the PCH is generated in a pattern repeated in the time domain, the EB-MS can perform coarse synchronization, i.e. can estimate a timing offset and a frequency offset, even though it is unaware of a correct value of the preamble sequence. In step 1303, the EB-MS identifies a BS type indicating whether the BS where it is currently located is an EB-BS or an NB-BS. The BS type identification process of step 1303 will be further described with reference to FIG. 15. In step 1305, the EB-MS detects a BS ID corresponding to a preamble sequence having the maximum correlation value through correlation calculation on the detected preamble sequence.

In step 1307, the EB-MS performs fine synchronization. In step 1309, the EB-MS performs channel estimation using the PCH or the PICH.

FIG. 14 shows a process in which an NB-MS performs cell acquisition, synchronization, and channel estimation in a frequency overlay communication system according to the present invention.

The NB-MS performs a similar operation to the operation performed by the EB-MS of FIG. 13. However, compared with the EB-MS that performs synchronization, cell acquisition and channel estimation using the EB-PCH, the NB-MS performs synchronization, cell acquisition and channel estimation using the NB-PCH and/or the NB-DPCH. The NB-MS receives the NB-PCH and the NB-DPCH with a time difference, and should shift the center frequency for reception of the two channels.

FIG. 15 shows a process in which an NB-MS or an EB-MS performs cell acquisition according to the present invention.

In step 1501, the NB-MS or EB-MS measures signal strengths, i.e. power values, of an NB-PCH#2 and an NB-PCH#2 upon its power-on. The power value of the NB-PCH#1 is defined as a P_NB-PCH#1, and the power value of the NB-PCH#2 is defined as a P_NB-PCH#2. In step 1503, the NB-MS or EB-MS determines whether the P_NB-PCH#1 and the P_NB-PCH#2 exceed a first power threshold P_Th1. If it is determined in step 1503 that the P_NB-PCH#1 and the P_NB-PCH#2 exceed the P_Th1, the NB-MS or EB-MS proceeds to step 1505. However, if the P_NB-PCH#1 and the P_NB-PCH#2 are lower than the P_Th1, the NB-MS or EB-MS proceeds to step 1519. When the P_NB-PCH#1 and the P_NB-PCH#2 exceed the P_Th1, there is a high probability that the NB-MS or EB-MS will be located in the coverage of an EB-BS.

In step 1505, the NB-MS or EB-MS determines whether an absolute value of the value determined by subtracting the P_NB-PCH#2 from the P_NB-PCH#1 is less than a second threshold P_Th2 in order to correctly recognize whether its current BS is an EB-BS or an NB-BS. This is based on the assumption that the P_NB-PCH#1 and the P_NB-PCH#2 are ideally equal to each other because the EB-BS manages an EB-PCH, i.e. a preamble channel composed of the NB-PCH#1 and the NB-PCH#2. However, even when the NB-MS or EB-MS is located in the same distance from the NB-BS managing the NB-PCH#1 and the NB-BS managing the NB-PCH#2, respectively, the P_NB-PCH#1 and the P_NB-PCH#2 can be equal to each other, or slightly different from each other. Therefore, in order to correctly recognize the BS type, the NB-MS or EB-MS proceeds to step 1507 when an absolute value of the value determined by subtracting the P_NB-PCH#2 from the P_NB-PCH#1 is less than the P_Th2. If the P_Th2 is less than or equal to the absolute value of the value determined by subtracting the P_NB-PCH#2 from the P_NB-PCH#1, the NB-MS or EB-MS proceeds to step 1513.

In step 1507, the NB-MS or EB-MS determines whether the P_NB-PCH#1 from the P_NB-PCH#2 are complementary to each other. If they are complementary to each other, the NB-MS or EB-MS proceeds to step 1509. If they are not complementary to each other, the NB-MS or EB-MS proceeds to step 1513.

In step 1509, the NB-MS or EB-MS recognizes that its current BS is an EB-BS. In step 1511, the NB-MS or EB-MS performs cell acquisition using a PCH, i.e. an EB-PCH composed of the NB-PCH#1 and the NB-PCH#2.

In step 1513, the NB-MS or EB-MS determines whether the P_NB-PCH#1 exceeds the P_NB-PCH#2. If it is determined in step 1513 that the P_NB-PCH#1 exceeds the P_NB-PCH#2, the NB-MS or EB-MS proceeds to step 1515. If the P_NB-PCH#1 is less than the P_NB-PCH#2, the NB-MS or EB-MS proceeds to step 1523.

In step 1515, the NB-MS or EB-MS recognizes that its current BS is a BS (NB1) using the NB-PCH#1, because the P_NB-PCH#1 is greater than the P_NB-PCH#2. In step 1517, the NB-MS or EB-MS performs cell acquisition using the NB-PCH#1.

In step 1519, the NB-MS or EB-MS determines whether the P_NB-PCH#1 exceeds the P_Th1. If it is determined that the P_NB-PCH#1 exceeds the P_Th1, the NB-MS or EB-MS proceeds to step 1515. If the P_NB-PCH#1 is less than the P_Th1, the NB-MS or EB-MS proceeds to step 1521. In step 1521, the NB-MS or EB-MS determines whether the P_NB-PCH#2 exceeds the P_Th1. If it is determined in step 1521 that the P_NB-PCH#2 exceeds the P_Th1, the NB-MS or EB-MS proceeds to step 1523. If the P_NB-PCH#2 is less than the P_Th1, the NB-MS or EB-MS proceeds to step 1501.

In step 1523, the NB-MS or EB-MS recognizes that its current BS is a BS (NB2) using the NB-PCH#2, because the P_NB-PCH#2 is greater than the P_NB-PCH#1. In step 1525, the NB-MS or EB-MS performs cell acquisition using the NB-PCH#2.

As can be understood from the foregoing description, the present invention allows an MS to perform cell acquisition in a frequency overlay communication system, facilitating efficient communication.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A system for performing cell acquisition in a frequency overlay communication system including a first frequency band and a second frequency band, the system comprising:

a base station (BS) for generating a reference signal used for identifying a cell using a specific sequence in a predetermined frequency band, and transmitting the reference signal; and a mobile station (MS) for receiving the reference signal to determine whether the BS uses the first frequency band or the second frequency band, determining a reference signal having a maximum correlation value through correlation calculation with at least one predefined sequence, and detecting a BS identifier (ID) corresponding to the determined reference signal, wherein the second frequency band is overlaid with the first frequency band, and includes an overlay region and a non-overlay region, wherein the overlay region is a band portion of the second frequency band included in the first frequency band, and the non-overlay region is a remaining band portion of the second frequency band that is not included in the first frequency band, and wherein the reference signal includes a first reference signal transmitted through the band portion, and a second reference signal transmitted through the remaining band portion.

2. The system of claim 1, wherein the BS generates the reference signal using a Golay complementary sequence (GCS) in the first frequency band or the second frequency band.

3. The system of claim 2, wherein the BS comprises:
a GCS pair generator for generating a first GCS pair and a second GCS pair associated with the first GCS pair in the first frequency band according to an input BS ID; and
a concatenator for concatenating the first GCS pair to the second GCS pair, and outputting a GCS used for generation of the reference signal.

4. The system of claim 1, wherein the BS generates the reference signal using a GCS in the second frequency band.

5. The system of claim 4, wherein the BS comprises:
a GCS pair generator for generating a GCS pair in the second frequency band according to an input BS ID; and
a concatenator for concatenating the GCS pair to each other and outputting a GCS.

6. The system of claim 1, wherein the MS receives the first reference signal and the second reference signal by changing a time difference or a center frequency.

7. The system of claim 6, wherein the MS
measures a first power value indicative of a power value of the first reference signal, and a second power value indicative of a power value of the second reference signal;
determines whether the first reference signal and the second reference signal are complementary to each other if the first power value and the second power value exceed a first threshold and an absolute value of a difference between the first power value and the second power value is less than a second threshold; and
recognizes that the BS uses the second frequency band, and identifies a BS using a third reference signal including the first reference signal and the second reference signal if the first reference signal and the second reference signal are complementary to each other.

8. The system of claim 7, wherein the MS recognizes that the BS uses the first frequency band, and identifies a BS using the first reference signal if the first power value and the second power value exceed the first threshold, the absolute value of the difference between the first power value and the second power value is greater than or equal to the second threshold, and the first power value exceeds the second power value.

9. The system of claim 7, wherein the MS recognizes that the BS uses the first frequency band, and identifies a BS using the first reference signal if any one of the first power value and the second power value is less than or equal to the first threshold and the first power value exceeds the first threshold.

10. The system of claim 9, wherein the MS recognizes that the BS uses the third frequency band, and identifies a BS using the second reference signal if any one of the first power value and the second power value is less than or equal to the first threshold, the first power value is less than or equal to the first threshold, and the second power value exceeds the first threshold.

11. The system of claim 7, wherein the MS recognizes that the BS uses the first frequency band, and identifies a BS using the first reference signal if the first power value and the second power value exceed the first threshold, the absolute value of the difference between the first power value and the second power value is less than the second threshold, and the first power value exceeds the second power value.

12. The system of claim 7, wherein the MS
measures the first power value and the second power value; and
recognizes that the BS uses the first frequency band, and identifies a BS using the first reference signal if the first power value and the second power value exceed the first threshold, the absolute value of the difference between the first power value and the second power value is less than the second threshold, the first reference signal and the second reference signal are not complementary to each other, and the first power value exceeds the second power value.

13. The system of claim 12, wherein the MS
measures the first power value and the second power value; and
recognizes that the BS uses the third frequency band, and identifies a BS using the second reference signal if the first power value and the second power value exceed the first threshold, the absolute value of the difference between the first power value and the second power value is greater than or equal to the second threshold, and the first power value is less than or equal to the second threshold.

14. A method for performing cell acquisition by a mobile station (MS) in a frequency overlay communication system including a first frequency band and a second frequency band, the method comprising:
receiving a reference signal used for identifying a cell using a specific sequence in a predetermined frequency band;
determining whether a corresponding base station (BS) uses the first frequency band or the second frequency band;
determining a reference signal having a maximum correlation value through correlation calculation with at least one predefined sequence; and
detecting a BS identifier (ID) corresponding to the determined reference signal,
wherein the second frequency band is overlaid with the first frequency band, and includes an overlay region and a non-overlay region,
wherein the overlay region is a band portion of the second frequency band included in the first frequency band, and the non-overlay region is a remaining band portion of the second frequency band that is not included in the first frequency band, and wherein the reference signal includes a first reference signal transmitted through the band portion, and a second reference signal transmitted through the remaining band portion.

15. The method of claim 14, wherein the reference signal is generated using a Golay complementary sequence (GCS) in the first frequency band or the second frequency band.

16. The method of claim 15, wherein the reference signal is generated using a GCS generated by concatenating a first GCS pair and a second GCS pair associated with the first GCS pair in the first frequency band to each other.

17. The method of claim 14, wherein the MS receives the first reference signal and the second reference signal by changing a time difference or a center frequency.

18. The method of claim 14, wherein the step of detecting a BS ID comprises:
measuring a first power value indicative of a power value of the first reference signal, and a second power value indicative of a power value of the second reference signal;
determining whether the first reference signal and the second reference signal are complementary to each other if the first power value and the second power value exceed a first threshold and an absolute value of a difference between the first power value and the second power value is less than a second threshold; and
recognizing that the BS uses the second frequency band, and detecting a BS ID using a third reference signal including the first reference signal and the second reference signal if the first reference signal and the second reference signal are complementary to each other.

19. The method of claim 18, wherein the MS recognizes that the BS uses the first frequency band, and detects a BS ID using the first reference signal if the first power value and the second power value exceed the first threshold, the absolute value of the difference between the first power value and the second power value is greater than or equal to the second threshold, and the first power value exceeds the second power value.

20. The method of claim 18, wherein the MS recognizes that the BS uses the first frequency band, and detects a BS ID using the first reference signal if any one of the first power value and the second power value is less than or equal to the first threshold and the first power value exceeds the first threshold.

21. The method of claim 20, wherein the MS recognizes that the BS uses the third frequency band, and detects a BS ID using the second reference signal if any one of the first power value and the second power value is less than or equal to the first threshold, the first power value is less than or equal to the first threshold, and the second power value exceeds the first threshold.

22. The method of claim 18, wherein the MS recognizes that the BS uses the first frequency band, and detects a BS ID using the first reference signal if the first power value and the second power value exceed the first threshold, the absolute value of the difference between the first power value and the second power value is less than the second threshold, and the first power value exceeds the second power value.

23. The method of claim 18, wherein the MS
measures the first power value and the second power value; and
recognizes that the BS uses the first frequency band, and detecting a BS ID using the first reference signal if the first power value and the second power value exceed the first threshold, the absolute value of the difference between the first power value and the second power value is less than the second threshold, the first reference signal and the second reference signal are not complementary to each other, and the first power value exceeds the second power value.

24. The method of claim 23, wherein the MS
measures the first power value and the second power value; and
recognizes that the BS uses the third frequency band, and detecting a BS ID using the second reference signal if the first power value and the second power value exceed the first threshold, the absolute value of the difference between the first power value and the second power value is greater than or equal to the second threshold, and the first power value is less than or equal to the second threshold.

25. A method for transmitting a reference signal for cell acquisition by a base station (BS) in a frequency overlay communication system including a first frequency band and a second frequency band, the method comprising:
generating a reference signal for cell identification using a specific sequence in a predetermined frequency band;
multiplexing the reference signal with data and a control signal; and
performing Inverse Fast Fourier Transform (IFFT) on the multiplexed signal and transmitting the IFFT-processed
wherein the second frequency band is overlaid with the first frequency band, and includes an overlay region and a non-overlay region,
wherein the overlay region is a band portion of the second frequency band included in the first frequency band, and the non-overlay region is a remaining band portion of the second frequency band that is not included in the first frequency band, and
wherein the reference signal includes a first reference signal transmitted through the band portion, and a second reference signal transmitted through the remaining band portion.

26. The method of claim 25, wherein the BS generates the reference signal using a Golay complementary sequence (GCS) in the first frequency band or the second frequency band.

27. The method of claim 26, wherein the BS
generates a first GCS pair and a second GCS pair associated with the first GCS pair in the first frequency band according to an input BS identifier (ID); and
concatenates the first GCS pair to the second GCS pair, and outputs a GCS used for generation of the reference signal.

28. The method of claim 25, wherein the BS generates the reference signal using a GCS in the second frequency band.

* * * * *